United States Patent Office 3,577,543
Patented May 4, 1971

3,577,543
INSECTICIDAL AND FUNGICIDAL 2-AMINO-PYRIMIDINYL-6-CARBAMATE COMPOSITIONS
Francis Leslie Charles Baranyovits, Ranajit Ghosh, Nigel Douglas Bishop, and Peter Frank Hilary Freeman, Bracknell, and William Glynne Moss Jones, Macclesfield, England, assignors to Imperial Chemical Industries Limited, London, England
No Drawing. Original application Mar. 10, 1967, Ser. No. 622,043, now Patent No. 3,493,574, dated Feb. 3, 1970. Divided and this application Nov. 14, 1969, Ser. No. 871,296
Claims priority, application Great Britain, Mar. 31, 1966, 14,272/66
Int. Cl. A01m 9/22
U.S. Cl. 424—251
6 Claims

ABSTRACT OF THE DISCLOSURE

Pesticidal compositions containing a 2-aminopyrimidinyl-6-carbamate or salts thereof. Representatve active ingredients are 5,6-dimethyl-2-dimethylamino-4-dimethylcarbamoyloxypyrimidine and the corresponding 5-ethyl-6-methyl, 5-n-propyl-6-methyl, 5-cyanoethyl-6-methyl derivatives. These compounds may be used in the form of dusting powders or granules, dips or sprays to combat fungal and/or insect infestations in plants and animals. They may also be used in fertilizers or otherwise to treat agricultural soils.

---

This is a division of our copending application, Ser. No. 622,043, filed Mar. 10, 1967, now U.S. Pat. 3,493,574.

This invention relates to new pyrimidine derivatives, to processes for making them, to compositions containing them and to methods for combating plant and animal pests.

Accordingly this invention provides, as new compounds, 2-aminopyrimidine-6-carbamates. The term "carbamate" in this specification and claims is to be understood, unless the text indicates otherwise, an including carbamates, thiocarbamates and dithiocarbamates.

The invention, more specifically, provides a pyrimidine compound having the formula:

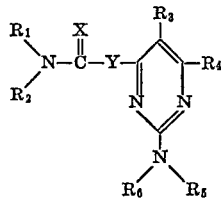

or a salt thereof, wherein X and Y are atoms of oxygen or sulfur; $R_1$ and $R_2$, and additionally, $R_5$ and $R_6$, represent atoms of hydrogen, substituted or unsubstituted hydrocarbon groups, or together with the adjacent N-atom, a substituted or unsubstituted heterocyclic ring and $R_3$ and $R_4$ represent atoms of hydrogen or halogen, substituted or unsubstituted hydrocarbon groups joined directly, or through an O-, S-, or N- atom, to the pyrimidine ring, or an alkylene bridging group.

Preferred hydrocarbon groups are alkyl, alkenyl, aryl and alkaryl and suitable heterocyclic rings are piperidine and morpholine rings.

In a further aspect, therefore, the invention provides a pyrimidine compound having the formula:

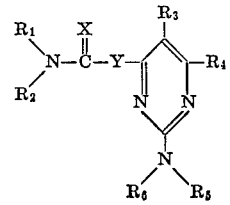

or a salt thereof, wherein $R_1$ and $R_2$ represent atoms of hydrogen, or are alkyl or aryl groups; X and Y represent atoms of oxygen or sulfur; $R_3$ and $R_4$ represent atoms of hydrogen or halogen, or are substituted or unsubstituted alkyl, alkenyl, or aryl groups joined directly, or through an O-, N- or S- atom, to the pyrimidine ring, or together represent an alkylene bridging group; and $R_5$ and $R_6$ represent atoms of hydrogen, or are alkyl groups, or together with the adjacent N-atom represent a piperidine- or morpholine- ring.

More particularly, the invention provides a compound of the formula:

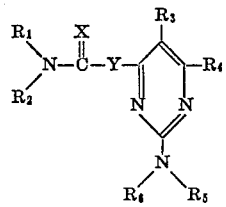

wherein $R_1$ and $R_2$, stand for hydrogen or alkyl groups, or phenyl groups which may optionally be substituted, and X and Y, are atoms of oxygen or sulphur, and $R_3$, $R_4$, $R_5$ and $R_6$, represent hydrogen, or alkyl, alkenyl, aryl or aralkyl groups, the aryl group in the latter two groups optionally being substituted, or $R_5$ and $R_6$, together with the adjacent nitrogen atom, constitute a heterocyclic ring, and a salt thereof.

As a suitable value for $R_1$, $R_2$, $R_3$, $R_4$, $R_5$ or $R_6$ when it stands for an alkyl group there may be mentioned, for example, an alkyl group of not more than 10 carbon atoms, and more particularly a lower alkyl group, that is an alkyl group of not more than 6 carbon atoms, for example the methyl, ethyl, n-propyl, n-butyl or n-amyl group.

In a preferred aspect, therefore, this invention provides a pyrimidine compound having the formula:

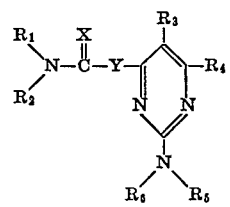

or a salt thereof, wherein $R_1$ and $R_2$ are hydrogen, lower alkyl or phenyl; and wherein X and Y are oxygen or sulphur; and wherein either (i) $R_3$ is hydrogen, halogen, lower alkyl, or alkenyl, o-chlorophenylthio, benzyl, alkoxy- or cyano- lower alkyl and $R_4$ is hydrogen, lower alkyl or phenyl, or (ii) $R_3$ and $R_4$ together represent a tri- or tetramethylene bridging group; and wherein $R_5$ and $R_6$ are lower alkyl, or together with the adjacent nitrogen atom represent a piperidine- or morpholine- ring. Particularly preferred compounds are those having the latter formula and wherein $R_1$ and $R_2$ are lower alkyl radicals; $R_3$ and $R_4$ represent hydrogen atoms or lower alkyl or lower alkenyl groups or together form an alkylene bridge; $R_5$ and $R_6$ are lower alkyl groups; and X and Y are both oxygen atoms.

Specific pyrimidyl carbamates of the invention which have been found to be particularly useful are listed in Table I below. The compounds all correspond to the general formula:

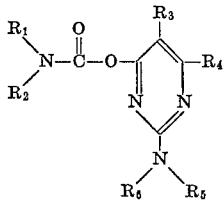

and the various substituent groups

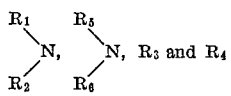, $R_3$ and $R_4$ for each compound are set out in columns under corresponding headings in Table I together with the physical characteristics for the particular compound. Melting points (M.P.) and boiling points (B.P.) are expressed in degrees centigrade.

TABLE I

| Compound No. | $R_1 \diagdown N- \diagup R_2$ | $R_5 \diagdown N- \diagup R_6$ | $R_4$ | $R_3$ | Physical properties |
|---|---|---|---|---|---|
| 1 | $CH_3 \diagdown N- \diagup CH_3$ | $CH_3 \diagdown N- \diagup CH_3$ | H | H | B.P. 96–98°/0.01 mm. |
| 2 | Same as above | Same as above | H | $CH_3$ | M.P. 115–116°. |
| 3 | do | do | $CH_3$ | H | M.P. 62°. |
| 4 | do | do | $CH_3$ | $CH_3$ | M.P. 90°. |
| 5 | do | do | $CH_3$ | $C_2H_5$ | M.P. 70–71°. |
| 6 | do | do | $CH_3$ | n-$C_3H_7$ | M.P. 46°; B.P. 115–120°/0.04 mm. |
| 7 | do | do | $CH_3$ | n-$C_4H_9$ | B.P. 109–112°/0.01 mm. |
| 8 | do | do | $CH_3$ | i-$C_4H_9$ | M.P. 70°. |
| 9 | do | do | $CH_3$ | n-$C_5H_{11}$ | B.P. 130°/0.03 mm.; $n_D^{20}$ 1.5214. |
| 10 | do | do | $CH_3$ | $CH_3 \diagdown CH(CH_2)_2- \diagup CH_3$ | M.P. 48–49°. |
| 11 | do | do | $CH_3$ | $-CH_2-CH=CH_2$ | B.P. 118–121° at 0.01 mm. |
| 12 | do | do | $CH_3$ | $CH_2-Ph$ | M.P. 116–117°. |
| 13 | do | do | $CH_3$ | Cl | M.P. 101°. |
| 14 | do | do | $CH_3$ | Br | M.P. 90–92°. |
| 15 | do | do | $C_2H_5$ | H | B.P. 87–90°/0.02 mm. |
| 16 | do | do | Same as above | n-$C_4H_9$ | B.P. 122–124°/0.05 mm. |
| 17 | do | do | n-$C_3H_7$ | H | B.P. 113–114°/0.01 mm.; $n_D^{20}$ 1.5251. |
| 18 | do | do | Same as above | $C_2H_5$ | M.P. 76°. |
| 19 | do | do | n-$C_5H_{11}$ | n-$C_4H_9$ | B.P. 152°/0.025 mm. |
| 20 | do | do | Ph | H | M.P. 106°. |
| 21 | do | $CH_3 \diagdown N- \diagup C_2H_5$ | H | H | B.P. 85–88°/0.01 mm. |
| 22 | do | Same as above | $CH_3$ | H | B.P. 90–93°/0.003 mm. |
| 23 | do | do | $CH_3$ | $CH_3$ | B.P. 108°/0.01 mm.; M.P. 48–50. |
| 24 | do | do | $CH_3$ | $C_2H_5$ | B.p. 99–103°/0.005 mm. |
| 25 | do | do | $CH_3$ | n-$C_3H_7$ | B.P. 117–118°/0.01 mm. |
| 26 | do | do | $CH_3$ | n-$C_4H_9$ | B.P. 106–109°/0.005 mm. |
| 27 | do | do | $CH_3$ | $-CH_2-CH=CH_2$ | B.P. 96–107°/0.008 mm. |
| 28 | do | $C_2H_5 \diagdown N- \diagup C_2H_5$ | $CH_3$ | H | B.P. 93–98°/0.007 mm. |
| 29 | do | Same as above | $CH_3$ | $CH_3$ | M.P. 78–79°. |
| 30 | do | do | $CH_3$ | $C_2H_5$ | B.P. 96–101°/0.02 mm. |
| 31 | do | do | $CH_3$ | $-CH_2-CH=CH_2$ | B.P. 110–115°/0.015 mm. |
| 32 | do | n-$C_4H_9 \diagdown N- \diagup$ n-$C_4H_9$ | $CH_3$ | M | B.P. 130–135°/0.01 mm.; $n_D^{24}$ 1.5080. |
| 33 | do | (piperidino) N— | Ph | M | M.P. 100–101°. |
| 34 | do | (morpholino) O⟨⟩N— | $CH_3$ | H | M.P. 110 |
| 35 | do | Same as above | $CH_3$ | $C_2H_5$ | M.P. 117–118°. |
| 36 | $CH_3 \diagdown N- \diagup C_2H_5$ | $CH_3 \diagdown N- \diagup CH_3$ | $CH_3$ | $CH_3$ | M.P. 68–69°. |
| 37 | Same as above | Same as above | $CH_3$ | $C_2H_5$ | B.P. 110–112°/0.005 mm. |
| 38 | do | do | $CH_3$ | n-$C_3H_7$ | B.P. 102–104°/0.01 mm. |
| 39 | do | do | $CH_3$ | n-$C_4H_9$ | B.P. 106–107°/0.008 mm. |
| 40 | do | do | $CH_3$ | $-CH_2-CH=CH_2$ | B.P. 112–118°/0.01 mm. |
| 41 | $C_2H_5 \diagdown N- \diagup C_2H_5$ | do | $CH_3$ | H | B.P. 142–144°/0.8 mm. |

TABLE I.—Continued

| Compound No. | $R_1, R_2 \diagdown N-$ | $R_5, R_6 \diagdown N-$ | $R_4$ | $R_3$ | Physical properties |
|---|---|---|---|---|---|
| 42 | Same as above | do | CH$_3$ | CH$_3$ | M.P. 78°. |
| 43 | do | do | CH$_3$ | C$_2$H$_5$ | B.P. 125–130°/0.075 mm.; M.P. 49–51°. |
| 44 | do | do | CH$_3$ | n-C$_3$H$_7$ | B.P. 127–135°/0.01 mm.; M.P. 53–54°. |
| 45 | do | do | CH$_3$ | n-C$_4$H$_9$ | B.P. 115–120°/0.01 mm.; M.P. 44°. |
| 46 | do | n-C$_4$H$_9$ \ N— / n-C$_4$H$_9$ | CH$_3$ | H | B.P. 162–164°/0.6 mm. |
| 47 | CH \ N— / CH$_3$ | CH$_3$ \ N— / CH$_3$ | —(CH$_2$)$_3$— | | M.P. 101°. |
| 48 | Same as above | Same as above | —(CH$_2$)$_4$— | | M.P. 96–97°. |
| 49 | do | do | C$_2$H$_5$ | CH$_3$ | B.P. 108–120°/0.01 mm.; M.P. 43°. |
| 50 | do | do | CH$_3$ | CH$_2$.CH$_2$.CH | M.P. 103–4°. |
| 51 | do | do | CH$_2$—CH$_2$—OCH$_2$—CH$_3$ | CH$_3$ | M.P. 58–59°. |

Further specific pyrimidyl carbamates are listed in Table II below. The compounds all correspond to the general formula:

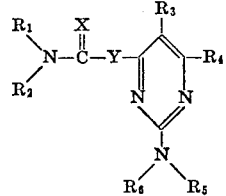

and, as in Table I above, the substituent groups

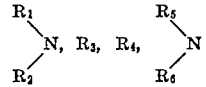 , R$_3$, R$_4$,

X and Y for each compound are set out in columns under corresponding headings.

TABLE II

| Compound No. | $R_1, R_2 \diagdown N$ | $R_5, R_6 \diagdown N$ | $R_4$ | $R_3$ | X | Y | Physical properties, M.P., ° |
|---|---|---|---|---|---|---|---|
| 52 | CH$_3$ \ N / CH$_3$ | CH$_3$ \ N / CH$_3$ | CH$_3$ | B C$_4$H$_9$ | O | S | |
| 53 | Same | Same | CH$_3$ | H | O | S | 72 |
| 54 | C$_6$H$_5$ \ N / C$_6$H$_5$ | do | CH$_3$ | R C$_4$H$_9$ | O | S | 104 |
| 55 | M \ N / CH$_3$ | do | CH$_3$ | CH$_3$ | S | S | 130–131 |
| 56 | Same | do | CH$_3$ | P C$_4$H$_9$ | S | S | 98–100 |
| 57 | CH$_3$ \ N / CH$_3$ | do | CH$_3$ | Cl—⟨phenyl⟩—B— | O | O | 96 |

In this specification the numbering of the pyrimidine ring is as follows:

It may be noted that the 4- and 6-positions are equivalent.

The compounds of this invention can be obtained by a number of different methods. According to a further feature of this invention we provide a process for the manufacture of the compounds of this invention, which comprises reacting a compound of the formula:

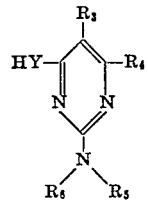

wherein R$_3$, R$_4$, R$_5$, R$_6$ and Y have any of the meanings stated above, with a carbamoyl halide of the formula:

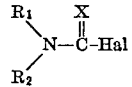

wherein R$_1$, R$_2$ and X have any of the meanings stated above, and Hal represents a halogen atom, under conditions where the hydrogen halide which is formed in the reaction is removed as it is produced. The hydrogen halide can be removed by passing a stream of inert gas, for example nitrogen, through the reaction mixture while the reaction is taking place. A more satisfactory method for removing the acid comprises carrying out the reaction in the presence of an acid acceptor, for example a base or a salt of a strong base and a weak acid. Various bases can be used for the purpose, for example alkali and alkaline earth metal hydroxides, aliphatic tertiary amines, and heterocyclic substances containing a nitrogen heteroatom, for example pyridine. In general, a salts of strong bases and weak acids are preferred, particularly alkali and alkaline earth metal carbonates, for example potassium carbonate. The reactions can be carried out either in the presence or the absence of a diluent, for example an organic solvent, at ambient or elevated temperatures. The reactions usually take place more readily at elevated temperatures, for example from 50° C. to 150° C. and preferably from 50° C. to 120° C. in the presence of an organic solvent, for example acetone. When a solvent is present the temperature at which the reaction is carried out is then determined by the boiling point of the solvent under the conditions in which it is used. The times taken for the reactions to achieve completion vary according to the nature of the reactants and the temperatures at which the reactions are carried out. In general, however, when temperatures of from 15° C. to 80° C. are employed the reactions are usually complete within a period of from 1 to 10 hours.

According to a further feature of the invention we provide a process for the manufacture of those of the compounds of the invention that are of the formula:

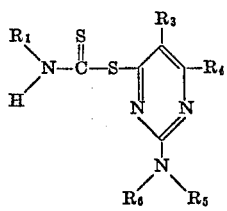

wherein $R_1$, $R_3$, $R_4$, $R_5$ and $R_6$ have any of the meanings stated above, which comprises reacting an isothiocyanate of the formula $R_1NCS$, wherein $R_1$ has the meaning stated above, with a compound of the formula:

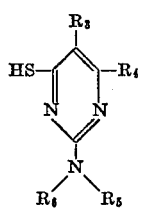

wherein $R_3$, $R_4$, $R_5$ and $R_6$ have any of the meanings stated above.

The reaction involving an isothiocyanate may be carried out in a diluent or solvent, for example benzene, and it may be accelerated or completed by the application of heat.

According to a further feature of the invention we provide a process for the manufacture of those of the compounds of the invention which are of the formula:

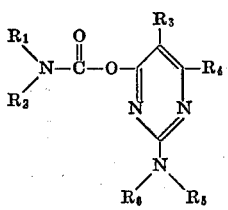

wherein $R_3$, $R_4$, $R_5$ and $R_6$ have any of the meanings stated above, and $R_1$ represents an alkyl group, and $R_2$ represents an alkyl group or a substituted or unsubstituted phenyl group, which comprises reacting a pyrimidine carbonate of the formula:

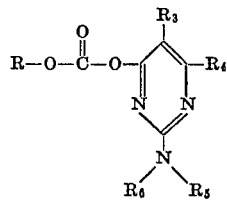

wherein $R_3$, $R_4$, $R_5$ and $R_6$ have any of the meanings stated above, and R stands for a substituted or unsubstituted alkyl or aryl group, or is a pyrimidine residue of the formula:

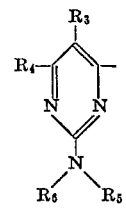

wherein $R_3$, $R_4$, $R_5$ and $R_6$ have any of the meanings stated above, and an amine of the formula $NHR_1R_2$ wherein $R_1$ and $R_2$ have any of the meanings stated above.

The reaction involving a pyrimidine carbonate may be carried out in a diluent or solvent, for example dioxan.

According to a further feature of this invention we provide a process for the manufacture of the compounds of the invention, which comprises reacting an amine of the formula $NHR_1R_2$, wherein $R_1$ and $R_2$ have any of the meanings stated above, with a compound of the formula:

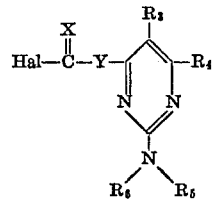

wherein $R_3$, $R_4$, $R_5$, $R_6$, X, Y and Hal have any of the means stated above.

According to a further feature of this invention we provide a process for making the compounds of the invention wherein X and Y are both atoms of oxygen, and $R_1$, $R_2$, $R_3$, $R_4$, $R_5$ and $R_6$ have any of the meanings stated above, which comprises reacting a hydroxy pyrimidine of the formula:

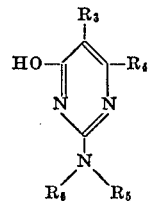

with phosgene, if necessary in the presence of a base, and also if necessary, in the presence of a solvent, and reacting the reaction product with an amine of the formula:

The reaction is preferably carried out at a temperature below 10° C. with the phosgene dissolved in an inert solvent, for example benzene, and the hydroxypyrimidine added to this solution. The hydroxypyrimidine is preferably admixed beforehand, for example to form a slurry with the base, a suitable base being, for example, triethylamine. The amine, for example dimethylamine, is then added to the reaction mixture as a solution, for example an aqueous solution.

The latter process is believed to be represented by the following equation:

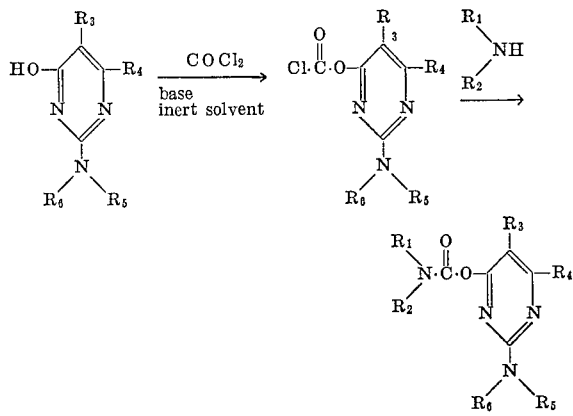

The compounds of the present invention are very toxic towards a variety of insect pests including mosquito larvae (*Aedes aegypti*), black aphids (*Aphis fabae*), green aphids (*macrosiphus pisi*), red spider mites (*Tetranychus telarius*), cotton stainer capsids (*Dysdercus fasciatus*), diamond back moth caterpillars (*Plutella maculipennis*), mustard beetles (*Phaedon cochleariae*), common houseflies (*Musca domestica*) and root knot nematodes (*Meloidogyne incognita*). Furthermore, the compounds of the invention have insecticidal action against insects that prey on animals, for example *Lucilia sericata*.

The compounds of the invention also possess activity against a wide variety of fungal diseases including, for example, the following specific diseases:

*Puccinia recondita* (rust) on wheat
*Phytophthora infestans* (late blight) on tomatoes
*Sphaerotheca fuliginea* (powdery mildew) on cucumber
*Erysiphe graminis* (powdery mildew) on wheat and barley
*Podosphaera leucotricha* (powdery mildew) on apple
*Uncinula necator* (powdery mildew) on vine
*Plasmopara viticola* (downy mildew) on vine
*Piricularia oryzae* (blast) on rice
*Venturia inaequalis* (scab) on apple.

The following specific compounds are particularly useful pesticidally:

5,6-dimethyl-2-dimethylamino-4-dimethylcarbamoyloxypyrimidine.
5-ethyl-6-methyl-2-dimethylamino-4-dimethylcarbamoyloxypyrimidine.
5-n-propyl-6-methyl-2-dimethylamino-4-dimethylcarbamoyloxypyrimidine.
5-cyanoethyl-6-methyl-2-dimethylamino-4-dimethylcarbamoyloxypyrimidine.

A particularly useful feature of the activity of the pyrimidine derivatives listed above is their systemic effect, that is to say, their ability to move throughout a plant to reach any part thereof and to combat any insect infestation or fungal infection thereon; it is possible with their use therefore to produce a composition which has valuable systemic insecticidal and fungicidal activity.

In use, the pyrimidine compounds, or compositions containing them, may be applied in a number of ways. Thus their application can suitably be directly onto the foliage of the plant or to infected and/or infested area thereof; alternatively the soil surrounding the plant, or soil in which seeds or plants are to be sown or planted can be treated with the pyrimidine compounds or compositions containing them. If desired, the seed themselves can be similarly treated.

In veterinary usage, the compounds of the invention may conveniently be administered to animals for the purpose of combating insect infestations.

According to a further feature of the invention, therefore, we provide a method of combating undesired fungal or insect infestations in plants which comprises applying to the locus of the plant a pyrimidine compound or a composition as hereinbefore defined.

In a further aspect of the invention we provide a method of combating undesired insect infestations in animals which comprises administering to an animal a pyrimidine compound or a composition as hereinbefore defined.

The invention further includes a method of combating fungal or insect infestations in plants which comprises applying to a plant or to seeds thereof a pyrimidine compound or a composition as hereinbefore defined.

In yet a further aspect of the invention, therefore, we provide a method of treating agricultural soil comprising applying to the soil a pyrimidine compound or a composition as hereinbefore defined.

The compounds and compositions of the invention may be used for agricultural, horticultural or veterinary purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolin, bentonite, kieselguhr, dolomite, calcium carbonate, talc, powdered magnesia, fuller's earth, gypsum, Mewitt's earth, diatomaceous earth and China clay. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic or non-ionic type. Suitable agents of the cationic type include, for example, quaternary ammonium compounds, for example, catyltrimethylammonium bromide. Suitable agents of the anionic type include, for example, soaps, salts of aliphatic monoesters of sulphuric acid, for example sodium lauryl sulphate, salts of sulphonated aromatic compounds, for example sodium dodecyl-benzenesulphonate, sodium, calcuim or ammonium lignosulphonate, butyl-naphthalene sulphonate, and a mixture of the sodium salts of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such octylphenol, nonylphenol and octylcresol. Other non-ionic agents are the partial esters derived from long chain fatty acids and hexitol anhydrides, the condensation products of the said partial esters with ethylene oxide, and the lecithins.

Suitable suspending agents are, for example, hydrophilic colloids, for example polyvinylpyrrolidone and sodium carboxymethylcellulose, and the vegetable gums, for example gum acacia and gum tragacanth.

The aqueous dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in the presence of a propellant such as fluorotrichloromethane or dichlorodifluoromethane.

By the inclusion of suitable additives, for example for improving the distribution, adhesive power and resistance to rain or treated surfaces, the different compositions can be better adapted for the various uses for which they are intended.

The pyrimidine derivatives may also be conveniently formulated by admixing them with fertilizers. A preferred composition of this type comprises granules of fertilizer material incorporating, for example coated with, a pyrimidine derivative. The fertilizer material may, for example, comprise nitrogen or phosphate-containing substances.

In yet a further aspect of the invention, therefore, we provide a fertilizer comprising a pyrimidine compound as hereinbefore defined.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10–85% by weight of the active ingredient or ingredients and generally from 25–60% by weight of the active ingredient or ingredients. When diluted to form aqueous preparations, such preparations may contain varying amounts of the active ingredient or ingredients depending upon the purpose for which they are to be used, but an aqueous preparation containing between 0.001% and 1.0% by weight of active ingredient or ingredients may be used.

It is to be understood that the fungicidal compositions of this invention may comprise, in addition to a pyrimidine derivative, one or more other compounds having biological activity.

When used for veterinary purposes, the compositions may be in the form of dips, sprays of dusting powders for external application and the compositions described above are suitable for this purpose. The veterinary compositions for external application and the compositions described above are suitable for this purpose. The veterinary compositions for external use may also be in the form of a hand dressing prepared from an ointment or cream base for example white petroleum jelly.

Alternatively, the veterinary compositions of the invention may be in a form suitable for oral administration, for example as tablets, capsules, boluses, suspensions, emulsions or solutions. The compositions for oral administration may contain conventional excipients, for example inert carriers, for example calcium phosphate, lubricating agents, for example, magnesium stearate, and granulating and disintegrating agents conventionally used in tablet manufacture, for example, starch and/or vegetable gums. The suspensions and emulsions may be prepared using conventional excipients described above.

Alternatively, the veterinary compositions of the invention may be in a form suitable for parenteral administration for example sterile solutions, suspensions or emulsions. The compositions for parenteral administration may contain conventional excipients, for example solvents, for example water, vegetable oils, or N,N-dimethylacetamide, and excipients described above conventionally used in the preparation of emulsions and suspensions.

The veterinary compositions of the invention may optionally additionally contain one or more substances of known veterinary utility, for example anthelmintics and/ or bactericides. Both the veterinary and agricultural compositions of the invention may in addition be stabilized by the incorporation therein of stabilising agents, for example epoxides, for example epichlorohydrin.

This invention is illustrated but not limited by the following examples.

EXAMPLE 1

This example illustrates the preparation of 2-dimethylamino-4-dimethylcarbamoyloxypyrimidine (Table 1 Compound No. 1) having the formula:

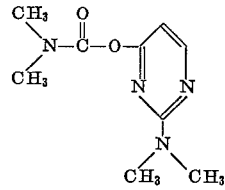

A mixture of 2-dimethylamino-4-hydroxypyrimidine (20.0 g.), anhydrous potassium carbonate (20.0 g.) and dimethylcarbamoyl chloride (13.0 cc.) in dry acetone (150 cc.) was refluxed for four hours, cooled to 20° C. and the insoluble portion filtered off and and washed with acetone (50 cc.). The washings and filtrate were combined and evaporated under reduced pressure, and the residual oil was disseolvd in chloroform (3 volumes) and washed first with 1% sodium hydroxide solution, and then with water until the washings were neutral. The chloroform extract was dried over anhydrous sodium sulphate, and the solvent removed under reduced pressure. The residue was distilled, and 2-dimethylamino-4-dimethylcarbamoyeloxypyrimidine was obtained as a colourless oil, B.P. 98° C./0.01 mm. Mg.

EXAMPLE 2

This example illustrates the preparation of 2-dimethylamino - 4 - dimethylcarbamoyloxy - 6 - methyl-5-n-propylpyrimidine (Table I Compound No. 6) having the formula:

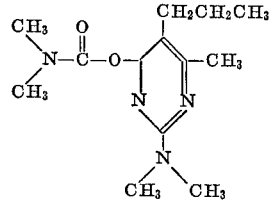

The procedure of Example 1 was followed except that 2-dimethylamino-4-hydroxy - 6 - methyl-5-n-propylpyrimidine (4.77 g.) was used in place of 2-dimethylamino-4-hydroxypyrimidine, together with anhydrous potassium carbonate (3.38 g.) and dimethylcarbamoyl chloride (2.25 cc.) in dry acetone (100 cc.). The product, 2-dimethylamino-4-dimethylcarbamoyloxy - 6 - methyl-5-n-propylpyrimidine, was obtained as a colourless oil, B.P. 105–109° C./0.04 mm. Hg, which crystallised on standing to a white solid, M.P. 46.5° C.

EXAMPLE 3

This example illustrates the preparation of 2-dimethylamino-4-dimethylcarbamoyloxy - 6 - methyl-5-n-amylpyrimidine (Table 1, Compound No. 9) having the formula:

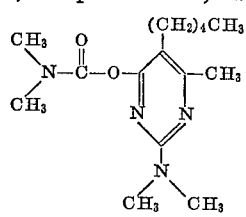

The procedure of Example 1 was followed except that 2 - dimethylamino - 4 - hydroxy-6-methyl-5-n-amylpyrimidine (11.15 g.) was used in place of 2-dimethylamino-4-hydroxypyrimidine, together with anhydrous potassium carbonate (6.9 g.) and dimethylcarbamoyl chloride (4.55 cc.) in dry acetone (100 cc.), and the mixture was refluxed for 8 hours. The product, 2-dimethylamino-4-dimethylcarbamoyloxy - 6 - methyl-5-n-amylpyrimidine, was obtained as a colourless oil, B.P. 130° C./0.03 mm. Hg.

EXAMPLE 4

This example illustrates the preparation of 4-dimethylcarbamoyloxy - 6 - methyl-2-(4 - morpholinyl)pyrimidine (Table 1, Compound No. 34) having the formula:

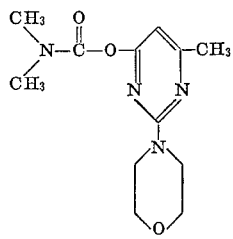

A mixture of 4-hydroxy-6-methyl-2-(4-morpholinyl)-pyrimidine (5.6 g.), anhydrous potassium carbonate (3.9 g.) and dimethylcarbamoyl chloride (2.55 cc.) in dry acetone (30 cc.) was refluxed for five hours. The mixture was then cooled to 20° C. and filtered to remove the insoluble material. The material was then washed with a hot mixture of equal amounts of chloroform and acetone, and the combined washings and filtrate evaporated under reduced pressure. The residual solid was triturated first with 5% sodium carbonate solution, and then with water, and then filtered to yield crude 4-dimethylcarbamoyloxy-6-methyl-2-(4-morpholinyl)-pyrimidine. The product was purified by recrystallisation from aqueous ethanol, and the pure product was then found to possess a M.P. of 110° C.

EXAMPLE 5

This example illustrates the preparation of 4-dimethylcarbamoyloxy - 5 - ethyl-6-methyl-2-(4-morpholinyl) pyrimidine (Table 1, Compound No. 35) having the formula:

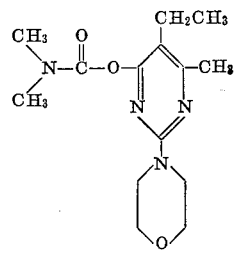

The procedure of Example 4 was followed, except that 5 - ethyl-4-hydroxy-6-methyl-2-(4-morpholinyl)pyrimidine (5.25 g.) was used in place of 4-hydroxy-6-methyl-2-(4-morpholinyl)pyrimidine, together with anhydrous potassium carbonate (3.5 g.), dimethylcarbamoyl chloride (2.3 cc.) and dry acetone (30 cc.). The product, 4-dimethylcarbamoyloxy-5-ethyl - 6 - methyl-2-(4-amorpholinyl)pyrimidine, possessed a M.P. of 115–118° C. after recrystallisation twice from ethanol containing charcoal.

EXAMPLE 6

This example illustrates the preparation of 2-dimethylamino-4-dimethylcarbamoyloxy - 6 - methyl-5-n-butylpyrimidine (Table 1, Compound No. 7) having the formula:

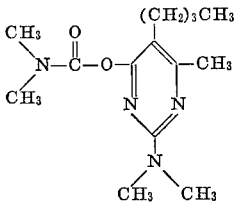

A mixture of 2-dimethylamino-4-hydroxy-6-methyl-5-n-butylpyrimidine (5.0 g.), anhydrous potassium carbonate (3.35 g.) and dimethylcarbamoyl chloride (2.2 cc.) in dry acetone (30 cc.) was refluxed for 7.5 hours, cooled to 20° C. and the insoluble portion filtered off and washed with a 1:1 mixture of acetone and chloroform. The combined washings and filtrate were evaporated under reduced pressure. The residual slurry of oil and solid was dissolved in methylene chloride (4 volumes) and washed with 1% sodium hydroxide solution, and then with water until the washings were neutral. The methylene chloride solution was dried over anhydrous sodium sulphate and filtered. The solvent was evaporated under reduced pressure, and the residual oil distilled. 2-dimethylamino 4-diethylcarbamoyloxy-6-methyl-5-n-butyl-pyrimidine was obtained as a colourless oil, B.P. 122–125° C./0.01 mm. Mg.

EXAMPLE 7

This example illustrates the preparation of 2-dimethylamino-4-dimethylcarbamoyloxy-6-methyl-5-n-butylpyrimidine by a procedure different from that given in Example 6, having the formula:

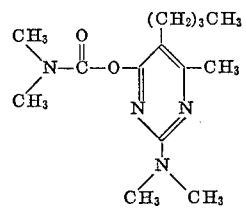

To a solution of 2-dimethylamino-4-hydroxy-6-methyl-5-n-butylpyrimidine (50.0 g.) in dry pyridine (500 cc., freshly distilled from solid potassium hydroxide) was added dimethylcarbamoyl chloride (35.0 cc.) at 17° C. The mixture was then stirred for 30 minutes during which time the temperature of the mixture rose to a maximum of 25° C. After allowing the mixture to stand for 72 hours at ambient temperature, the pyridine was removed under reduced pressure and the residual mixture of oil and solid distributed between a 1:1 mixture of chloroform and water. The aqueous layer was discarded and the chloroform layer washed with a 1% sodium hydroxide solution (2×100 cc.), and with water until neutral washings were obtained. After drying the chloroform layer over anhydrous sodium sulphate, and removal of the solvent under reduced pressure, the residual oil was distilled to yield 2-dimethylamino-4-dimethylcarbamoyloxy-6-methyl-5-n-butylpyrimidine as a colourless oil, B.P. 125° C./0.015 mm. Hg, identical with the product obtained in Example 6.

EXAMPLE 8

This example illustrates the preparation of 2-dimethylamino - 6 - dimethylcarbamoylthio - 4 - methyl-5-n-butylpyrimidine (Table II Compound No. 51) having the formula:

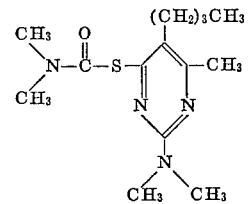

4.5 g. (.02 M) of 2-dimethylamino-6-mercapto-4-methyl-5-n-butylpyrimidine, 3 g. (.022 M) of anhydrous potassium carbonate and 50 mls. acetone were stirred at room temperature for five minutes. Then 2.15 g. (.02 M) of dimethylcarbamoyl chloride were added and the whole refluxed for 5 hours. The reaction mixture was filtered, the acetone evaporated, and the residue taken up in methylene dichloride, washed with dilute alkali, then with water, and finally dried over anhydrous sodium sulphate. Methylene dichloride was evaporated and the red oil obtained was heated on a steam bath under high vacuum (0.1 mm.) for a quarter of an hour.

*Analysis.*—Required (percent): C, 56.8; H, 8.1; N, 18.9; S, 10.8. Found (percent): C, 56.8; H, 8.2; N, 18.7; S, 10.8.

EXAMPLE 9

This example illustrates the preparation of 2-dimethylamino - 6 - diphenylcarbamoylthio - 4 - methyl-5-n-butylpyrimidine (Table 2, Compound No. 53) having the formula:

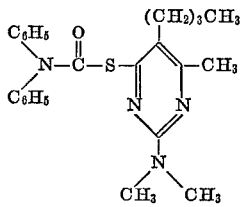

The procedure of Example 8 was followed, using 4.63 g. of diphenylcarbamoyl chloride. The residue, after evaporation of the methylene dichloride, was recrystallised from ethanol (M.P. 104° C.).

EXAMPLE 10

This example illustrates the preparation of 4,5-dimethyl-2-dimethylamino - 6 - dimethylcarbamoylthiopyrimidine (Table 2, Compound No. 52) having the formula:

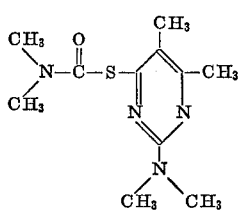

5.5 g. (.033 M) of 2-dimethylamino-4-mercapto-5,6-dimethylpyrimidine, 4.9 g. (.036 M) of anhydrous potassium carbonate and 50 mls. acetone were stirred at room temperature for 5 minutes. 3.5 g. (.033 M) of dimethylcarbamoyl chloride were added and the whole refluxed for 5 hours. The reaction mixture was filtered, the acetone evaporated and the residue taken up in methylene dichloride, washed with dilute alkali, then with water, and finally dried over anhydrous sodium sulphate. Methylene dichloride was evaporated and the residue recrystallised from ethyl acetate/petroleum ether. (M.P. 72° C.).

EXAMPLE 11

This example illustrates the preparation of 4,5-dimethyl-2-dimethylamino-6-methylthiocarbamoylthiopyrimidine (Table 2, Compound No. 54) having the formula:

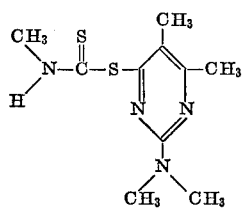

2 g. (0.11 M) of 2-dimethylamino-6-mercapto-4,5-dimethylpyrimidine and 1 ml. of methyl isothiocyanate were refluxed in 25 mls. benzene for 3 hours. The benzene was evaporated and the residue recrystallised from benzene (M.P. 131° C.).

EXAMPLE 12

This example illustrates the preparation of 2-dimethylamino - 4 - methyl-6-methylthiocarbamoylthio-5-n-butylpyrimidine (Table 2, Compound No. 55) having the formula:

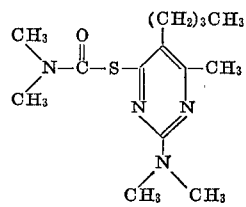

2.5 g. (0.011 M.) of 2-dimethylamino - 6 - mercapto-4-methyl-5-n-butylpyrimidine and 1 ml. of methyl isothiocyanate were refluxed in 25 mls. benzene for 3 hours. The benzene was evaporated and the residue recrystallised from ethanol. (M.P. 98–100° C.).

EXAMPLE 13

This example illustrates the preparation of 2-dimethylamino - 4 - dimethylcarbamoyloxy-6-phenylpyrimidine (Table 1, Compound No. 20) having the formula:

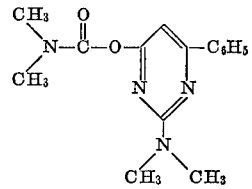

The procedure of Example 4 was followed except that 2-dimethylamino-4-hydroxy-6-phenylpyrimidine was used in the place of 4-hydroxy-6-methyl-2-(4-morpholinyl)pyrimidine, together with anhydrous potassium carbonate (2.93 g.), dimethylcarbamoyl chloride (1.9 cc.) and dry acetone (30 cc.). This product, 2-dimethylamino - 4 - dimethylcarbamoyloxy - 6 - phenylpyrimidine, was obtained as a white solid, M.P. 106° C., after recrystallisation from ethanol containing charcoal.

EXAMPLE 14

This example illustrates the preparation of 4-dimethylcarbamoyloxy - 6 - phenyl-2-(1-piperidimyl)pyrimidine (Table 1, Compound No. 33) having the formula:

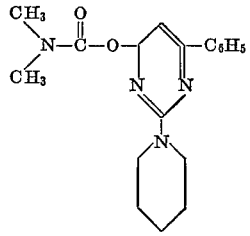

The procedure of Example 4 was followed except that 4-hydroxy - 6 - phenyl-2-(1-piperidinyl)pyrimidine (5.76 g.) was used in place of 4-hydroxy-6-methyl-2-(4-morpholinyl)pyrimidine, together with anhydrous potassium carbonate (3.2 g.), dimethylcarbamoyl chloride (2.1 cc.) and dry acetone (30 cc.). The product, 4-dimethylcarbamoyloxy-6-phenyl - 2 - (1-piperidinyl)pyrimidine was obtained as a solid having an M.P. of 100–101° C. after recrystallisation from ethanol.

EXAMPLE 15

This example illustrates the preparation of 2-dimethylamino - 4 - dimethylcarbamoyloxy-6-methylpyrimidine (Table 1, Compound No. 3) having the formula:

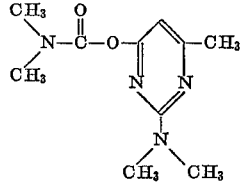

Dimethylcarbamoyl chloride (42 g.) was added to a stirred solution of 2-dimethylamino-4-hydroxy-6-methylpyrimidine (54 g.) in dry pyridine (270 g.). The mixture was stirred at ambient temperature for 12 hours, after which it was heated on a steam bath for 2 hours. The reaction mixture was then cooled and filtered, and the pyridine was removed from the filtrate by evaporation in vacuo. The residue was extracted with ether, and the ethereal extract was washed with water and then dried with anhydrous magnesium sulphate. The ether was removed by evaporation and the residue was crystallised from light petroleum (B.P. 60–80° C.). There was thus obtained 2-dimethylamino - 4 - dimethylcarbamoyloxy-6-methylpyrimidine, M.P. 61–62° C.

EXAMPLE 16

This example illustrates the preparation of 4-dimethylcarbamoyloxy - 2 - di-n-butylamino-6-methylpyrimidine (Table 1, Compound No. 32) having the formula:

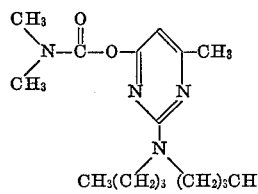

The procedure of Example 15 was followed except that the 2 - dimethylamino-4-hydroxy-6-methylpyrimidine was replaced by 86 g. of 2 - di-n-butylamino-4-hydroxy-6-methylpyrimidine. The product was isolated as an oil of B.P. 165° C./3 mm. Hg.

EXAMPLE 17

This example illustrates the preparation of the product described in Example 15 by a different process from that described in Example 15.

2-dimethylamino - 4 - hydroxy-6-methylpyrimidine (7.7 g.) was dissolved in dry dioxan (250 g.), and a 50% dispersion of sodium hydride in mineral oil (2.4 g.) was added. The mixture was stirred and heated on a steam bath for 2 hours. The mixture was then cooled to 15° C., stirring was continued, and a solution of phosgene (2.5 g.) in dioxan (25 g.) was added over 30 minutes. When the addition was completed the mixture was stirred for a further 60 minutes, and then filtered. The dioxan was evaporated in vacuo from the filtrate, the residue was triturated with light petroleum (B.P. 40–60° C.), and the mixture filtered. 30 g. of the solid residue [presumed to be bis-(2-dimethylamino - 6 - methylpyrimid-4-yl)carbonate] were dissolved in dry dioxan (600 g.), the solution stirred, and a solution of dimethylamine (4 g.) in dioxan (60 g.) was added thereto over 30 minutes. Following this addition, the reaction mixture was stirred for 12 hours, and the dioxan was then evaporated in vacuo. The residue was fractionally distilled in vacuo (B.P. 117° C./0.35 mm. Hg), and there was obtained 2-dimethylamino-4-dimethylcarbamoyloxy - 6 - methylpyrimidine, M.P. 61–62° C.

EXAMPLE 18

This example illustrates the preparation of 4-dimethylcarbamoyloxy-2-dimethylamino - 6 - methylpyrimidine (Table 1, Compound No. 41) having the formula:

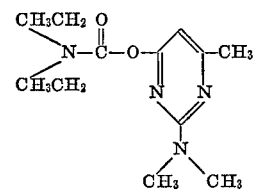

Diethylcarbamoyl chloride (9.7 g.) was added to a stirred solution of 2-dimethylamino-4-hydroxy-6-methylpyrimidine (10 g.) in dry pyridine (50 ml.). The mixture was stirred at ambient temperature for 12 hours, after which it was heated on a steam bath for 3 hours. The product was then isolated as described in Example 15. There was thus obtained 4-diethylcarbamoyloxy-2-dimethylamino-6-methylpyrimidine as an oil, B.P. 142–143° C./0.8 mm. Hg.

EXAMPLE 19

This example illustrates the preparation of 4-diethylcarbamoyloxy - 2 - di - n - butylamino-6-methylpyrimidine (Table 1, Compound No. 46) having the formula:

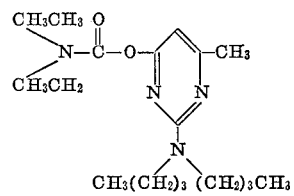

The procedure of Example 18 was followed except that the 2-dimethylamino-4-hydroxy-6-methylpyrimidine was replaced by 15.1 grams of 2-di-n-butylamino-4-hydroxy-6-methylpyrimidine. The product was isolated as an oil of B.P. 162–164° C./0.6 mm. Hg.

EXAMPLE 20

This example illustrates the preparation of 5,6-dimethyl-2-dimethylamino-4-dimethycarbamoylprimidine (Table 1, Compound No. 4) having the structure:

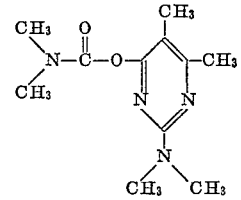

by a different method from that described in the general method outlined in Example 22.

To a 12.5% w./w. solution of phosgene in benzene (35 cc.) was carefully added as slurry of 5,6-dimethyl-2-dimethylamino-4-hydroxypyrimidine (7.1 g.) in a solution containing triethylamine (4.3 g.) in benzene (100 cc.) keeping the reaction temperature in the region 5–8° C. After the mixture had been stirred for a period of 45 minutes, a solution of dimethylamine (3.9 g.) in water (10 cc.) was added dropwise, with vigorous stirring keeping the reaction temperature below 10° C. by external cooling. When the addition was complete the mixture was stirred for successive 30 minute periods at 10° C. and 20° C. Water (50 cc.) was then added and the stirring continued until the solid present had dissolved. The benzene layer was separated, washed with water, then with saturated sodium bicarbonate solution, finally with water, and dried over anhydrous sodium sulphate. After evaporation of the solvent the residue was recrystallized from 60–80 petroleum ether to yield white crystals of 5,6-dimethyl - 2 - dimethylamino - 4 - dimethylcarbamoylpyrimidine, M.P. 88–9° C.

EXAMPLE 21

The following general method was used to prepare the compounds listed below; in each case the appropriate hydroxypyrimidine and dialkyl carbamoyl chloride were used as reactants: To a solution of the hydroxy pyrimidine in freshly distilled pyrimidine was added the equivalent of dialkyl carbamoyl chloride at 15–30° C. After standing for a short period at the ambient temperature, the mixture was heated to 70–80° C. for a period of 2–18 hours, with stirring, at the end of which time the pyrimidine was removed under reduced pressure. The residue was distributed between methylene chloride and water and the organic phase subjected to two washes with water, two washes with 4% sodium hydroxide solution and then with water until neutral washings were obtained. After drying the methylene chloride solution over sodium sulphate and filtering to remove the solid, the methylene chloride was removed under reduced pressure and the residue purified, if an oil by distillation at high vacuum, if a solid by crystallization from an appropriate solvent.

| Compound No.: | Time of reaction in hours |
|---|---|
| 2 | 3 |
| 5 | 4 |
| 8 | 4 |
| 21 | 8 |
| 22 | 5 |
| 23 | 8 |
| 24 | 7.5 |
| 25 | 7 |
| 26 | 5 |
| 27 | 7.75 |
| 28 | 18 |
| 29 | 14 |
| 30 | 8 |
| 31 | 8 |
| 36 | 7 |
| 37 | 8 |
| 38 | 7 |
| 39 | 7 |
| 40 | 7 |
| 42 | 3 |
| 43 | 3.5 |
| 44 | 3 |
| 45 | 3 |
| 47 | 6 |
| 48 | 6 |
| 49 | 6 |
| 50 | 8 |

EXAMPLE 22

The following general method was used to prepare the compounds listed below; in each case the appropriate hydroxypyrimidine and dialkylcarbamoyl chloride were used as reactants:

To a mixture of the hydroxy pyrimidine with an equivalent amount of a base e.g. anhydrous potassium carbamate, is a suitable medium e.g. dry acetone, was added the equivalent amount of dialkylcarbamoylchloride at 15–30° C. The mixture was then refluxed for 3–12 hours with stirring at the end of which time the mixture was coled, diluted with methylene chloride and the solid removed by filtration. After removal of solvents from the filtrate under reduced pressure the residue was dissolved in methylene chloride and thereafter treated by washing as in Method 1, followed by distillation or crystallisation as appropriate.

| Compound No.: | Time of reaction in hours |
|---|---|
| 4 | 8 |
| 19 | 12 |

EXAMPLE 23

This example illustrates a concentrate comprising a miscible oil which is readily convertible by dilution with water into a liquid preparation suitable for spraying purposes. The concentrate has the following composition:

|  | Percent wt. |
|---|---|
| Compound of Example 1 | 25.0 |
| "LUBROL" L (alkylphenol/ethylene oxide condensate; "Lubrol" is a trademark) | 2.5 |
| Calcium dodecylbenzenesulphonate | 2.5 |
| "AROMASOL" H (alkylbenzene solvent; "Aromasol" is a trademark) | 70.0 |
|  | 100.0 |

EXAMPLE 24

This example also illustrates a concentrate which is in the form of a miscible oil. The composition of this concentrate is as follows:

|  | Percent wt. |
|---|---|
| Compound of Examule 2 | 25.0 |
| "LUBROL" L ("Lubrol" is a trademark) | 4.0 |
| Calcium dodecylbenzenesulphonate | 6.0 |
| "AROMASOL" ("Aromasol" is a trademark) | 65.0 |
|  | 100.0 |

EXAMPLE 25

This example illustrates a wettable powder having the following composition:

|  | Percent wt. |
|---|---|
| Compound of Example 3 | 25.0 |
| Sodium silicate | 5.0 |
| Calcium lignosulphonate | 5.0 |
| China caly | 65.0 |
|  | 100.0 |

EXAMPLE 26

This example illustrates an atomisable fluid comprising a mixture consisting of 25% by weight of the compound of Example 4 and 75% by weight of xylene.

EXAMPLE 27

This example illustrates a dusting powder which may be applied directly to plants or other surfaces and comprises 1% by weight of the compound of Example 5 and 99% by weight of talc.

EXAMPLE 28

25 parts by weight of the product described in Example 15, 65 parts by weight of xylene, and 10 parts of an alkyl aryl polyether alcohol ("Triton" X–100; "Triton" is a trademark) were mixed in a suitable mixer. There was thus obtained an emulsion concentrate which can be mixed with water to produce an emulsion suitable for spraying domestic animals for the treatment of parasitic infestatione, and suitable for use in agricultural applications.

EXAMPLE 29

5 parts by weight of the product described in Example 15 were thoroughly mixed in a suitable mixer with 95 parts by weight of talc. There was thus obtained a dusting powder suitable for the treatment of parasitic infestations of domestic animals.

EXAMPLE 30

10 parts by weight of the product described in Example 15, 10 parts of an ethylene oxide-octylphenol condensate ("Lissapol" NX; "Lissapol" is a trademark) and 80 parts by weight of diacetone alcohol were thoroughly mixed. There was thus obtained a concentrate which, on mixing with water, gave an aqueous dispersion suitable for application as a spray in the control of insect pests.

EXAMPLE 31

This example illustrates a concentrated liquid formulation in the form of an emulsion. The ingredients listed below were mixed together in the stated proportions and the whole stirred until the constituents were dissolved.

|  | Percent wt. |
|---|---|
| Compound No. 5 (Table 1) | 20 |
| ""LUBROL" L ("Lubrol" is a trademark) | 17 |
| Calcium dodecylbenzenesulphonate | 3 |
| Ethylene dichloride | 45 |
| "AROMASOL" M ("Aromasol" is a trademark) | 15 |
|  | 100 |

EXAMPLE 32

The ingredients listed below were ground together in the proportions stated to produce a powdered mixture readily dispersible in liquids.

| | Percent wt. |
|---|---|
| Compound No. 4 (Table 1) | 50 |
| Dispersol T | 5 |
| China clay | 45 |
| | 100 |

EXAMPLE 33

A composition in the form of grains readily dispersible in a liquid (for example water) was prepared by grinding together the first four of the ingredient listed below in the presence of water and then the sodium acetate was mixed in. The admixture was dried and passed through a British Standard mesh sieve, size 44–100 to obtain the desired size of grains.

| | Percent wt. |
|---|---|
| Compound No. 4 (Table 1) | 50 |
| Dispersol T | 12.5 |
| Goulac | 5 |
| Calcium dodecylbenzenesulphonate | 12.5 |
| Sodium acetate | 20 |
| | 100.0 |

EXAMPLE 34

A composition suitable for use as a seed dressing was prepared by mixing all three of the ingredients set out below in the proportions stated.

| | Percent wt. |
|---|---|
| Compound No. 4 (Table 1) | 80 |
| Mineral oil | 2 |
| China clay | 18 |
| | 100 |

EXAMPLE 35

A granular composition was prepared by dissolving the active ingredient in a solvent, spraying the solution obtained onto the granules of pumice and allowing the solvent to evaporate.

| | Percent wt. |
|---|---|
| Compound No. 4 (Table 1) | 5 |
| Pumice granules | 95 |
| | 100 |

EXAMPLE 36

A col. formulation was prepared by mixing and grinding the ingredients recited below in the proportions stated.

| | Percent wt. |
|---|---|
| Compound No. 4 (Table 1) | 40 |
| Goulac | 10 |
| Water | 50 |
| | 100 |

The toxicity of a number of the compounds of this invention towards a variety of insect pests was investigated and the tests conducted and results obtained are set out below. The compounds of the invention were in each case used in the form of a liquid preparation containing 0–1% by weight of the compound. The preparations were made by dissolving each of the compounds in a mixture of solvents consisting of 4 parts by volume of acetone and 1 part by volume of diacetone alcohol. The solutions were then diluted with water containing 0.01% by weight of a wetting agent sold under the trade name of "LISSAPOL" NX until the liquid preparations contained the required concentration of the compound ("LISSAPOL" is a trademark).

The test procedure adopted with regard to each test insect was basically the same and comprised supporting a number of the insects on some medium which may be a host plant or some foodstuff on which the insect feeds, and treating either or both the insect and the medium with the preparations. The mortality of the insects was then assessed at periods varying from one to three days after the treatment.

The results of the tests are given below in Tables III and IV. In these tables the first column indicates the compound used. Each of the subsequent columns indicates the name of the test insect, the host plant or medium on which it was supported, and the number of days which were allowed to elapse after treatment before assessing the percentage of insects which had been killed. The assessment is expressed in integers which range from 0 to 3.

0 represents less than 30% kill
1 represents from 30–49% kill
2 represents from 50–90% kill
3 represents over 90% kill The concentration of the invention compound in the solutions used was 1,000 parts per million for all the pests except in the cases of *Aedes aegypta* (Table III) and *Meloidogyne incognita* (Table IV) when the concentration of the invention compound in the solution used was 100 parts per million.

TABLE III

| | Aedes aegypta | Aphis fabae | Macrosiphum pisi | Tetranychus telarius | Tetranychus telarius | Dysdercus fasciatus | Phaedon cochleariae | Musca domestica |
|---|---|---|---|---|---|---|---|---|
| | Mosquito larva | Black aphid | Green aphid | Red spider mite | Red spider egg | Cotton stainer capsid | Mustard beetle | Housefly |
| | Water | Broad bean | Broad bean | French bean | French bean | Cotton | Mustard/paper | Milk and sugar cotton wool |
| Compound No. | | 2 days | 2 days | 3 days | 3 days | 3 days | 2 days | 1 day |
| 1 | 0 | 3 | 3 | 2 | 0 | 3 | 0 | 3 |
| 2 | 0 | 3 | 3 | 0 | 0 | 0 | 0 | 1 |
| 3 | 0 | 3 | 3 | 2 | 0 | 2 | 0 | 3 |
| 4 | 1 | 3 | 3 | 3 | 3 | 3 | 3 | 3 |
| 5 | 2 | 3 | 3 | 2 | 0 | 2 | 0 | 3 |
| 6 | 2 | 3 | 3 | 3 | 0 | 2 | 0 | 2 |
| 7 | 0 | 3 | 3 | 3 | 0 | 0 | 0 | 0 |
| 8 | 0 | 3 | 3 | 0 | 0 | 0 | 0 | 0 |
| 9 | 0 | 3 | 3 | 0 | 0 | 0 | 0 | 0 |
| 10 | 0 | 3 | 3 | 0 | 0 | 0 | 0 | 0 |
| 11 | 3 | 3 | 3 | 3 | 0 | 3 | 0 | 3 |
| 12 | 0 | 0 | 2 | 0 | 0 | | | |
| 13 | 3 | 3 | 3 | 0 | 0 | 0 | 0 | 0 |
| 14 | 2 | 3 | 3 | 0 | 0 | 0 | 0 | 3 |
| 15 | 1 | 3 | 3 | 1 | 0 | 2 | 0 | 3 |
| 16 | 0 | 3 | 3 | 2 | 0 | 3 | 0 | 0 |
| 17 | 2 | 3 | 3 | 2 | 0 | 0 | 1 | 3 |
| 18 | 2 | 3 | 3 | 0 | 0 | 0 | 0 | 3 |

TABLE III.—Continued

| Compound No. | Aedes aegypta / Mosquito larva / Water | Aphis fabae / Black aphid / Broad bean / 2 days | Macrosiphum pisi / Green aphid / Broad bean / 2 days | Tetranychus telarius / Red spider mite / French bean / 3 days | Tetranychus telarius / Red spider egg / French bean / 3 days | Dysdercus fasciatus / Cotton stainer capsid / Cotton / 3 days | Phaedon cochleariae / Mustard beetle / Mustard/paper / 2 days | Musca domestica / Housefly / Milk and sugar cotton wool / 1 day |
|---|---|---|---|---|---|---|---|---|
| 19 | 3 | 1 | 3 | 3 | 2 | 0 | 0 | 0 |
| 21 | 3 | 3 | 3 | 0 | 0 | 2 | 3 | 3 |
| 22 | 3 | 3 | 3 | 0 | 0 | 0 | 1 | 3 |
| 23 | 0 | 3 | 3 | 2 | 0 | 0 | 2 | 2 |
| 24 | 2 | 3 | 3 | 0 | 0 | 0 | 0 | 3 |
| 25 | 0 | 3 | 3 | 2 | 0 | 0 | 0 | 0 |
| 26 | 0 | 3 | 3 | 1 | 0 | 0 | 0 | 1 |
| 27 | 3 | 3 | 3 | 3 | 0 | 2 | 0 | 3 |
| 28 | 2 | 3 | 3 | 0 | 0 | 0 | 1 | 3 |
| 29 | 0 | 3 | 3 | 2 | 0 | 0 | 0 | |
| 30 | 0 | 3 | 3 | 3 | 0 | 0 | 0 | |
| 31 | 0 | 3 | 3 | 3 | 0 | 0 | 0 | |
| 32 | 0 | 2 | 3 | 3 | 0 | 0 | 0 | 0 |
| 33 | 0 | 0 | 1 | 0 | 0 | | | 0 |
| 34 | 0 | 3 | 3 | 1 | 1 | 0 | 0 | 3 |
| 35 | 0 | 3 | 3 | 0 | 0 | 0 | 0 | 3 |
| 36 | 0 | 3 | 3 | 3 | 0 | 0 | | |
| 37 | 0 | 3 | 3 | 3 | 0 | 0 | | |
| 38 | 0 | 3 | 3 | 3 | 0 | 0 | | |
| 39 | 0 | 3 | 3 | 3 | 0 | 0 | | |
| 40 | 0 | 3 | 3 | 3 | 0 | 0 | | |
| 41 | 2 | 3 | 3 | 0 | 0 | 0 | 0 | 0 |
| 42 | 0 | 3 | 3 | 0 | 0 | 0 | 0 | 0 |
| 43 | 0 | 3 | 3 | 2 | 1 | 0 | 0 | 0 |
| 44 | 0 | 3 | 3 | 2 | 0 | 0 | 0 | 0 |
| 45 | 1 | 3 | 3 | 1 | 0 | 0 | 0 | 0 |
| 46 | 3 | 3 | 3 | 0 | 0 | 0 | 0 | 0 |
| 47 | 3 | 3 | 3 | 3 | 0 | 0 | 3 | 3 |
| 48 | 3 | 3 | 3 | 3 | 3 | 0 | 1 | |
| 49 | 0 | 3 | 3 | 0 | 0 | 0 | 0 | 0 |
| 50 | 0 | 3 | 3 | 3 | 2 | 0 | 0 | 0 |
| 51 | 0 | 3 | 3 | 3 | 0 | 0 | 0 | 0 |
| 52 | 0 | 3 | 3 | 2 | 0 | 0 | 0 | 0 |
| 53 | 0 | 0 | 3 | 0 | 0 | 0 | 0 | 0 |
| 54 | 0 | 0 | 2 | 0 | 0 | | | |
| 55 | 3 | 0 | 0 | 0 | 0 | 0 | 0 | 0 |
| 57 | 2 | 0 | 1 | 0 | 0 | | | |

TABLE IV

*Meloidogyne incognita* (Root Knot Nematode) water, 2 days

| Compound No: | |
|---|---|
| 22 | 1 |
| 26 | 3 |
| 27 | 3 |
| 30 | 3 |

Further tests were conducted to investigate the activity of the invention compounds against the larvae of sheep blow fly (*Lucilia sericata*). Details of the test procedure are as follows:

The active compound (30 mg.) is dispersed in 3 mls. 0.3% Dispersol OG using a ball mill and 0.1 ml. of the resulting dispersion added to 0.9 ml. horse serum in a flat-bottomed 2" and 1" tube to give a compound concentration of 1000 p.p.m. A little cotton wool is then placed in the tube to absorb the serum mixture and the larvae of *Lucilia sericata* added, the tube being then plugged with a polyurethane foam plug and incubated at 30° C. for 24 hours. A complete kill of larva is sought and if obtained, a repeat assay is done at concentrations of 500, 250 and 125 p.p.m. Activity at 125 p.p.m. results in a further assay at 256, 128, 64, 32, 16, 8, 4, 2, 1, 0.5 and 0.125 p.p.m. Activity is expressed as the least concentration of drug which under these conditions gives a 100% kill and the results of the various tests are set out below in Table V.

TABLE V

| Compound No. (Table I): | Activity (Concentration p.p.m giving 100% kill) |
|---|---|
| 5 | 0.5 |
| 8 | 2.0 |
| 11 | 0.5 |
| 13 | 8.0 |
| 14 | 2.0 |
| 15 | 2.0 |
| 17 | 1.0 |
| 18 | 0.5 |
| 21 | 4.0 |
| 22 | 0.5 |
| 23 | 1.0 |
| 24 | 0.125 |
| 25 | 0.5 |
| 26 | 250.0 |
| 27 | 4.0 |
| 47 | 0.5 |

Compositions according to the invention were made up in the following manner and tested against various fungal diseases, and the results of these tests are shown in Table V hereinafter. In the tests, both a protectant and an eradicant test were carried out and in the protectant test, the plants were sprayed so that the leaves were wetted, with a solution or suspension containing 500 parts per million of the active compound and 0.1% of a wetting agent, and after 24 hours were inoculated with the disease, the extent of which was assessed visually at the end of the test. In the eradicant test, the plants were inoculated with the disease and then, after a number of days depending on the disease, the leaves were wetted by spraying with a solution or suspension containing 500 parts per million of the active compound and 0.1% of a wetting agent. The results are shown in Table V below as a grading giving the percentage amount of disease as follows:

| Grading: | Percentage amount of disease |
|---|---|
| 0 | 61 to 100 |
| 1 | 26 to 60 |
| 2 | 6 to 25 |
| 3 | 0 to 5 |

TABLE VI

| Compound No. | Puccinia recondita (Rust) Wheat 10 days Prot. | Erad. | Phytophthora infestans (Late blight) Tomato 4 days Prot. | Erad. | Sphaerotheca fuliginea (Powdery mildew) Cucumber 10 days Prot. | Erad. | Erysiphe graminis (Powdery mildew) Wheat 10 days Prot. | Erad. | Erysiphe graminis (Powdery mildew) Barley 10 days Prot. | Erad. | Podosphaera leucotricha (Powdery mildew) Apple 7-14 days Prot. | Erad. | Uncinula necator (Powdery mildew) Vine 14 days Prot. | Erad. | Plasmopara viticola (Downy mildew) Vine 7 days Prot. | Erad. | Piricularia oryzae (Blast) Rice 7 days Prot. | Erad. | Venturia inaequalis (Scab) Apple 14 days Prot. | Erad. |
|---|---|---|---|---|---|---|---|---|---|---|---|---|---|---|---|---|---|---|---|---|
| 1 | 0 | 0 | 2 | — | 0 | 0 | 0 | — | 0 | — | 1 | — | 0 | — | 1 | — | 0 | — | 0 | — |
| 2 | 0 | 0 | — | — | 0 | 0 | 0 | — | 1 | — | 0 | — | 0 | — | 0 | — | 1 | — | 0 | — |
| 3 | 2 | 0 | 3 | — | 2 | 2 | 1 | — | 1 | — | 1 | — | 0 | — | 1 | — | 1 | — | 0 | — |
| 4 | 0 | 0 | 2 | — | 3 | 3 | 3 | — | 3 | — | 2 | — | 1 | — | 2 | — | 0 | — | 2 | — |
| 5 | 0 | 0 | 0 | — | 3 | 3 | 3 | — | 3 | — | 3 | — | 2 | — | 0 | — | 0 | — | 3 | — |
| 6 | 1 | 0 | 2 | — | 3 | 3 | 3 | — | 3 | — | 3 | 2 | 3 | — | 2 | — | 0 | — | 2 | — |
| 7 | 0 | 0 | 0 | — | 3 | 3 | 3 | — | 3 | — | 3 | 1 | 0 | — | 1 | — | 0 | — | 2 | — |
| 8 | 1 | 0 | 1 | — | — | — | 1 | — | 1 | — | — | — | 1 | — | 1 | — | 0 | — | 3 | — |
| 9 | 0 | 0 | 0 | — | 3 | 3 | 3 | — | 3 | — | 3 | — | 0 | — | 2 | — | 0 | — | 0 | — |
| 10 | 1 | 0 | 1 | — | — | — | 1 | — | 0 | — | 0 | — | 0 | — | 0 | — | 0 | — | 0 | — |
| 11 | 0 | 0 | 0 | — | 3 | 0 | 0 | — | 0 | — | 1 | — | 0 | — | 2 | — | 0 | — | 3 | — |
| 12 | 1 | 0 | 1 | — | 3 | 1 | 2 | — | 1 | — | 2 | — | 0 | — | 1 | — | 2 | — | 2 | — |
| 13 | 0 | 0 | 0 | — | 3 | 3 | 0 | — | 2 | — | — | — | 0 | — | 1 | — | 0 | — | 1 | — |
| 14 | 2 | 0 | 0 | — | 2 | 0 | 2 | — | 2 | — | 2 | — | 3 | — | 0 | — | 0 | — | — | — |
| 15 | 2 | 0 | 1 | — | 0 | 0 | 0 | — | 0 | — | — | — | 0 | — | — | — | 3 | — | 1 | — |
| 16 | 0 | 0 | 1 | — | 3 | 3 | 0 | — | 0 | — | — | — | 3 | — | — | — | — | — | 1 | — |
| 17 | 0 | 0 | 0 | — | 0 | 1 | 2 | — | 2 | — | 0 | — | 3 | — | 3 | — | — | — | 3 | — |
| 18 | 0 | 0 | 0 | — | 0 | 0 | 3 | — | 3 | — | 3 | 2 | 3 | — | 2 | — | 1 | — | 3 | — |
| 19 | 2 | 0 | 1 | — | 2 | 0 | 0 | — | 0 | — | 0 | — | 0 | — | 0 | — | 1 | — | 0 | — |
| 20 | 0 | 0 | 0 | — | 0 | 0 | 0 | — | 0 | — | 1 | — | 0 | — | 0 | — | 1 | — | 1 | — |
| 21 | 2 | 0 | 0 | — | 2 | 2 | 0 | — | 0 | — | 2 | — | 0 | — | 0 | — | 2 | — | 0 | — |
| 22 | 1 | 0 | 0 | — | 3 | 3 | 3 | — | 0 | — | 1 | — | 0 | — | 0 | — | 0 | — | 1 | — |
| 23 | 0 | 0 | 0 | — | 2 | 2 | 3 | — | 3 | — | 2 | — | 0 | — | 2 | — | 2 | — | 0 | — |
| 24 | 0 | 0 | 0 | — | 3 | 3 | 3 | — | 3 | — | 1 | — | 0 | — | 1 | — | 0 | — | 2 | — |
| 25 | 0 | 0 | 0 | — | 3 | 3 | 3 | — | 3 | — | 2 | — | 0 | — | 0 | — | 0 | — | 2 | — |
| 26 | 1 | 0 | 0 | — | 3 | 3 | 3 | — | 3 | — | 3 | — | 0 | — | 1 | — | 0 | — | 3 | — |
| 27 | 0 | 1 | 0 | — | 0 | 1 | 3 | — | 0 | — | 2 | — | 0 | — | — | — | — | — | — | — |
| 28 | 0 | 1 | 0 | — | 0 | 0 | 0 | — | — | — | — | — | — | — | — | — | — | — | — | — |
| 29 | 0 | 0 | 1 | — | 3 | 0 | 3 | — | 3 | — | 3 | — | 1 | — | 2 | — | 0 | — | — | — |
| 31 | 0 | 0 | 0 | — | 0 | 0 | 3 | — | 3 | — | 2 | — | 1 | — | 0 | — | 0 | — | 3 | — |
| 32 | 0 | 0 | 0 | — | 0 | 0 | 0 | — | — | — | 1 | — | 1 | — | 2 | — | 3 | — | 1 | — |
| 33 | 1 | 0 | 1 | — | 3 | 0 | 2 | — | 3 | — | 1 | — | 1 | — | 1 | — | 0 | — | 0 | — |
| 34 | 0 | 0 | 1 | — | 3 | 1 | 3 | — | 3 | — | 1 | — | 0 | — | 0 | — | 3 | — | 3 | — |
| 35 | 1 | 0 | 1 | — | 3 | 3 | 2 | — | 3 | — | 3 | — | 3 | — | 0 | — | 0 | — | 0 | — |
| 36 | 0 | 0 | 1 | — | 3 | 3 | 0 | — | 3 | — | 3 | — | 0 | — | 0 | — | 1 | — | 0 | — |
| 37 | 0 | 0 | 1 | — | 3 | 3 | 3 | — | 3 | — | 3 | — | 1 | — | 0 | — | 0 | — | 0 | — |
| 38 | 0 | 0 | 1 | — | 3 | 3 | 3 | — | 3 | — | 3 | — | 1 | — | 1 | — | 0 | — | 0 | — |
| 39 | 1 | 0 | 2 | — | 3 | 3 | 0 | — | 3 | — | 0 | — | 0 | — | 0 | — | 0 | — | 3 | — |
| 40 | 0 | 0 | 0 | — | 0 | 0 | 0 | — | 0 | — | 2 | — | 2 | — | 0 | — | 0 | — | 0 | — |
| 41 | 0 | 0 | 0 | — | 1 | 0 | 3 | — | 3 | — | 3 | — | 1 | — | 1 | — | 0 | — | 0 | — |
| 42 | 1 | 0 | 1 | — | 0 | 0 | 2 | — | 3 | — | 2 | — | 0 | — | 3 | — | 0 | — | 0 | — |
| 43 | 0 | 0 | 1 | — | 3 | 3 | 3 | — | 0 | — | 3 | — | 2 | — | 0 | — | 0 | — | 3 | — |
| 44 | 0 | 0 | 1 | — | 3 | 3 | 3 | — | 3 | — | 3 | — | 1 | — | 1 | — | 1 | — | 0 | — |
| 45 | 1 | 0 | 1 | — | 0 | 0 | 2 | — | 0 | — | 1 | — | 0 | — | 3 | — | 2 | — | 2 | — |
| 46 | 0 | 1 | 2 | — | 3 | 0 | 3 | — | 1 | — | 1 | — | 0 | — | 1 | — | — | — | 3 | — |
| 47 | 1 | 1 | 1 | — | 0 | 0 | 0 | — | 3 | — | 3 | 3 | 0 | — | 0 | — | 3 | — | 0 | — |
| 48 | 1 | 0 | 2 | — | 1 | 0 | 0 | — | 0 | — | 2 | 3 | 1 | — | 3 | — | 3 | — | 2 | — |
| 52 | 0 | 0 | 1 | — | 1 | 3 | 2 | — | 0 | — | 1 | — | 1 | — | 0 | — | 0 | — | 0 | — |
| 53 | 0 | 0 | 0 | — | 1 | 0 | 0 | — | 0 | — | — | — | — | — | — | — | — | — | — | — |
| 54 | 2 | 0 | 2 | — | 0 | 3 | 0 | — | 3 | — | 3 | — | 1 | — | 3 | — | 3 | — | 2 | — |
| 55 | 2 | 0 | — | — | 3 | 0 | 2 | — | — | — | — | — | — | — | — | — | — | — | — | — |
| 56 | 0 | 0 | 1 | — | 0 | 0 | 0 | — | 0 | — | 1 | — | 0 | — | 0 | — | 0 | — | 0 | — |
| 57 | — | — | — | — | — | — | 2 | — | 1 | — | 1 | — | 3 | — | 2 | — | 3 | — | 0 | — |

What we claim is:

1. A biologically active insecticidal and fungicidal composition comprising as active ingredient an effective insecticidal and/or fungicidal amount of a compound having the formula:

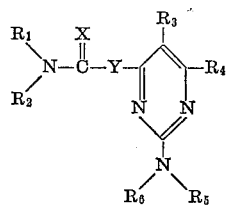

and the pesticidally-active acid-addition salts thereof, wherein $R_1$ and $R_2$ are hydrogen, lower alkyl or phenyl; and wherein X and Y are oxygen or sulphur; and wherein either (i) $R_3$ is hydrogen, halogen, lower alkyl, lower alkenyl, o-chlorophenylthio, benzyl, lower alkoxy- or cyano-lower alkyl and $R_4$ is hydrogen, lower alkyl, lower alkenyl or phenyl, or (ii) $R_3$ and $R_4$ together represent a tri- or tetra-methylene bridging group; and wherein $R_5$ and $R_6$ are hydrogen, lower alkyl, or together with the adjacent nitrogen atom represent a piperidino- or morpholino-ring and a diluent carrier.

2. A biologically active composition according to claim 1 wherein the diluent carrier is a wetting agent.

3. A biologically active composition according to claim 1 comprising from 0.001% to 85% by weight of the active ingredient.

4. A method of combating undesired fungal and/or insect infestations in plants which comprises applying to the locus of the infestation an effective insecticidal and/or fungicidal amount of a compound claimed in claim 1.

5. A method of combating undesired insect infestations in animals which comprises administering to an animal an effective insecticidal and/or fungicidal amount of a pyrimidine compound claimed in claim 1.

6. A method of treating undesired fungal and/or insect infestations in agricultural soil comprising applying to the soil an effective insecticidal and/or fungicidal amount of a pyrimidine compound claimed in claim 1.

References Cited

UNITED STATES PATENTS 3,337,572  8/1967  Kilsheimer et al. _____ 424—251

FOREIGN PATENTS 548,752  10/1956  Italy.

SHEP K. ROSE, Primary Examiner